United States Patent
Yang et al.

(10) Patent No.: US 8,794,507 B2
(45) Date of Patent: Aug. 5, 2014

(54) METHOD AND APPARATUS FOR APPLYING TWO-DIMENSIONAL CODES

(75) Inventors: Jian Yang, Shenzhen (CN); Lei Wang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 533 days.

(21) Appl. No.: 12/780,144

(22) Filed: May 14, 2010

(65) Prior Publication Data

US 2010/0219240 A1 Sep. 2, 2010

Related U.S. Application Data

(63) Continuation of application No. PCT/CN2008/073257, filed on Nov. 28, 2008.

(30) Foreign Application Priority Data

Dec. 6, 2007 (CN) .......................... 2007 1 0178883

(51) Int. Cl.
*G06K 17/00* (2006.01)
*G06F 7/00* (2006.01)
*G06K 7/10* (2006.01)

(52) U.S. Cl.
USPC .................. 235/375; 235/376; 235/462.01

(58) Field of Classification Search
USPC .................. 235/375–376, 42.01–462.496, 235/42.01–462.49
See application file for complete search history.

(56) References Cited

U.S. PATENT DOCUMENTS

| | | | | |
|---|---|---|---|---|
| 6,568,596 | B1* | 5/2003 | Shaw | 235/462.01 |
| 6,793,127 | B2* | 9/2004 | Alsafadi et al. | 235/375 |
| 2005/0092839 | A1* | 5/2005 | Oram | 235/462.13 |
| 2005/0139674 | A1* | 6/2005 | Ishibashi et al. | 235/454 |
| 2006/0000910 | A1* | 1/2006 | Chong et al. | 235/462.15 |
| 2007/0152058 | A1* | 7/2007 | Yeakley et al. | 235/462.01 |
| 2008/0052192 | A1* | 2/2008 | Fisher | 705/26 |

FOREIGN PATENT DOCUMENTS

| | | |
|---|---|---|
| CN | 1523531 A | 8/2004 |
| CN | 1988703 A | 6/2007 |
| CN | 101043643 A | 9/2007 |
| CN | 101187974 A | 5/2008 |

OTHER PUBLICATIONS

International Search Report issued Mar. 12, 2009 in connection with International Patent Application No. PCT/CN2008/073257.
Written Opinion of the International Searching Authority dated Mar. 12, 2009 in connection with International Patent Application No. PCT/CN2008/073257.
Partial translation of Office Action dated Jan. 16, 2009 in connection with Chinese Patent Application No. 200710178883.5.
"White Paper on Mobile Codes", Open Mobile Alliance, Nov. 23, 2007, 25 pages.

* cited by examiner

*Primary Examiner* — Michael G Lee
*Assistant Examiner* — Laura Gudorf

(57) ABSTRACT

A method and an apparatus for applying two-dimensional codes are provided herein. The method includes: obtaining two-dimensional code data; resolving the two-dimensional code data to obtain an operation procedure specified in the two-dimensional code data; and using an application to execute the operation procedure specified in the two-dimensional code data. In the embodiments of the present invention, a local application of the terminal may be executed to perform the service procedure according to the action sequence specified in the two-dimensional code. In this way, users have a friendly service operation guide, the information fed back by the users is standardized, and the processing of the service platform is simplified.

2 Claims, 9 Drawing Sheets

METHOD AND APPARATUS FOR APPLYING TWO-DIMENSIONAL CODES

CROSS-REFERENCE TO RELATED APPLICATIONS

This application is a continuation of International Application No. PCT/CN2008/073257, filed on Nov. 28, 2008, which Claims priority to Chinese Patent Application No. 200710178883.5, filed on Dec. 6, 2007, both of which are hereby incorporated by reference in their entireties.

TECHNICAL FIELD

The present invention relates to computer application technologies, and in particular, to a method and an apparatus for applying two-dimensional codes.

BACKGROUND

The barcode technology is a new technology that emerges on the basis of the computer technology and the information technology, and integrates coding, printing, identification, data collection, and processing. With the development of the modern new technologies, two-dimensional barcodes are applied wider and wider. Two-dimensional barcodes are characterized by high density and large capacity, and are suitable for representing data files (including Chinese character files) and pictures. Two-dimensional barcodes may be the most ideal means of storing, carrying, and automatically identifying large-capacity and highly reliable information such as credentials and cards.

Radio Frequency Identification (RFID) is an automatic identification technology that emerges in the 1990s. It uses radio frequencies to perform contactless bidirectional communication, so as to identify information and exchange data. Unlike magnetic cards and IC cards based on contact identification, the RFID system enables identification without physical contact between the electronic label and the reader-writer. Therefore, the RFID can identify multiple targets and motional targets, and can be applied in wider fields. A typical RFID system is composed of an electronic label, a reader-writer, and a data switching and management system. An electronic label is also known as a Radio Frequency (RF) card, and is capable of smart reading and writing and encrypted communication. A readerwriter is composed of a radio transceiver module, an antenna, a controlling module, and an interface circuit.

The Near Field Communication (NFC) technology evolves from the RFID technology combined with the Interconnection technology. An NFC chip integrates a contactless card reader, a contactless card, and point-to-point functions. It works in an area of several centimeters at a frequency of 13.56 MHz, and the working data rate is 106 Kbps and 212 Kbps. A dedicated NFC device can accomplish a transmission efficiency of 424 Kbps or higher.

The NFC device can work in an active mode or passive mode, and implement communication between passive devices such as contactless smart card and RF answerer. The NFC technology can easily implement information transmission that ranges from mobile phone numbers to electronic transaction. The NFC technology can accomplish information switching, content access, and service switching between any two wireless devices only if the two devices are close to each other without cable connection so that the communication distance between the two radio devices is shortened drastically.

Mobile payment is a payment method that uses a handheld device as a new terminal for transaction. The mobile payment system is sorted into macro payment and micro payment depending on the transaction sum, and sorted into remote payment and local payment depending on the geographic location. Typical technologies applied in the mobile payment include: Short Message Service (SMS), Wireless Application Protocol (WAP) RFID, and NFC. Mobile payment protocols include Micro Payment Transfer Protocol (MPTP) and Payword (offline payment system). FIG. 1 is a typical flowchart of mobile payment based on a Payword protocol.

An identification service based on two-dimensional codes in the conventional art is: encoding relevant information to generate two-dimensional code symbols, using the photographing function of the terminal to obtain the two-dimensional code symbols, decoding the two-dimensional code symbols through decoding software in the terminal, and finally, processing the information carried in the two-dimensional codes through an application and providing the corresponding services for the terminal user.

The foregoing method provides a means of obtaining information quickly for the terminal user. The method is primarily applied in the following fields:

1. Name Card

A user makes the name card information into two-dimensional code symbols through PC client software or a relevant website, and prints the information on the name card. After two persons exchange the name card in a business activity, the party that receives the name card uses a mobile phone capable of identifying two-dimensional codes to collect the two-dimensional code symbols, identify the name card information in the two-dimensional code symbols, and display the name card information on the mobile phone. The user may store the content of the name card into a directory of the mobile phone, or synchronize the content to a personal information management server, and may dial a phone number or send an email according to the stored information.

2. Service Marketing

The operator or the Value-Added Service (VAS) provider may publish service information (such as corporate website, content URL, customer service telephone number, advertisement information) on a website, magazine or any of the plane media. Through a mobile phone capable of identifying two-dimensional codes, the user identifies such information, and manually performs the operations such as information browse, service subscription, and content downloading.

3. Voting

Many programs involve voting of audience. The program provider may publish the program information on a website, magazine or any of the plane media. Through a mobile phone capable of identifying two-dimensional codes, the user identifies such information, inputs certain contents into the mobile phone, and then sends the contents to a certain number through SMS.

In the solution in the conventional art, the two-dimensional code technology defines only static information such as name card and URL. The user needs to remember and input the specific number manually, so it is rather inconvenient. Besides, the information fed back by the user is in nonstandard formats, so it is difficult for the service platform to process.

SUMMARY

The embodiments of the present invention provide a method and an apparatus for applying two-dimensional codes. Through the method and the apparatus herein, users have a friendly service operation guide, the information feedback by the users is standardized, and the processing of the service platform is simplified.

A method for applying two-dimensional codes in an embodiment of the present invention includes:
  obtaining two-dimensional code data;
  resolving the two-dimensional code data to obtain an operation procedure specified in the two-dimensional code data; and
  executing the operation procedure specified in the two-dimensional code data.

An apparatus for applying two-dimensional codes in an embodiment of the present invention includes:
  a two-dimensional code data obtaining module, adapted to obtain and store two-dimensional code data;
  a two-dimensional code data resolving module, adapted to resolve the two-dimensional code data obtained by the two-dimensional code data obtaining module to obtain an operation procedure specified in the two-dimensional code data; and
  an operation procedure executing module, adapted to invoke a corresponding application to execute the operation procedure obtained by the two-dimensional code data resolving module.

In the technical solution under the present invention, an operation procedure is specified in the two-dimensional code data, the terminal reads the two-dimensional codes, and executes the service procedure through a local application of the terminal according to the specified action sequence. In this way, users have a friendly service operation guide, the information fed back by the users is standardized, and the processing of the service platform is simplified.

DETAILED DESCRIPTION

The embodiments of the present invention provide a method and an apparatus for applying two-dimensional codes. In the embodiments of the present invention, a specific format is set in the two-dimensional code. The specific format may be a template file, and the specific format information may include operation step identifier information, content information, or service identifier information, or any combination thereof. The corresponding operation procedure is identified through the specific format, and the operation procedure may include an action sequence. After obtaining the two-dimensional code in which the specific format is set, the terminal of the user resolves the two-dimensional code to obtain the operation procedure specified in the two-dimensional code, and executes the local application of the terminal to perform the service procedure according to the action sequence included in the operation procedure.

Five embodiments of the method for applying two-dimensional codes are given below.

First Embodiment

This embodiment refers to using two-dimensional codes to vote.

The beauty show program on the TV allows users to join the program through voting.

When the vote step begins, the TV screen gives a two-dimensional code. The user can photograph the two-dimensional code on the TV screen through a camera of the terminal, and input the two-dimensional code information into the terminal. Besides, the user can photograph the corresponding two-dimensional code printed on the newspaper, magazine or poster to input the two-dimensional code information into the terminal.

Figure 1:
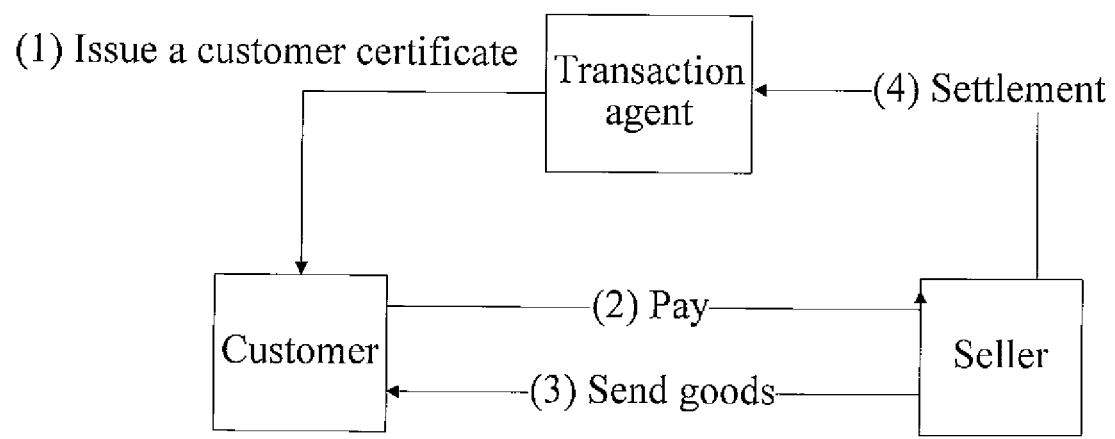
FIG. 1 is a typical flowchart of mobile payment based on a Payword protocol in the conventional art.
Figure 2:
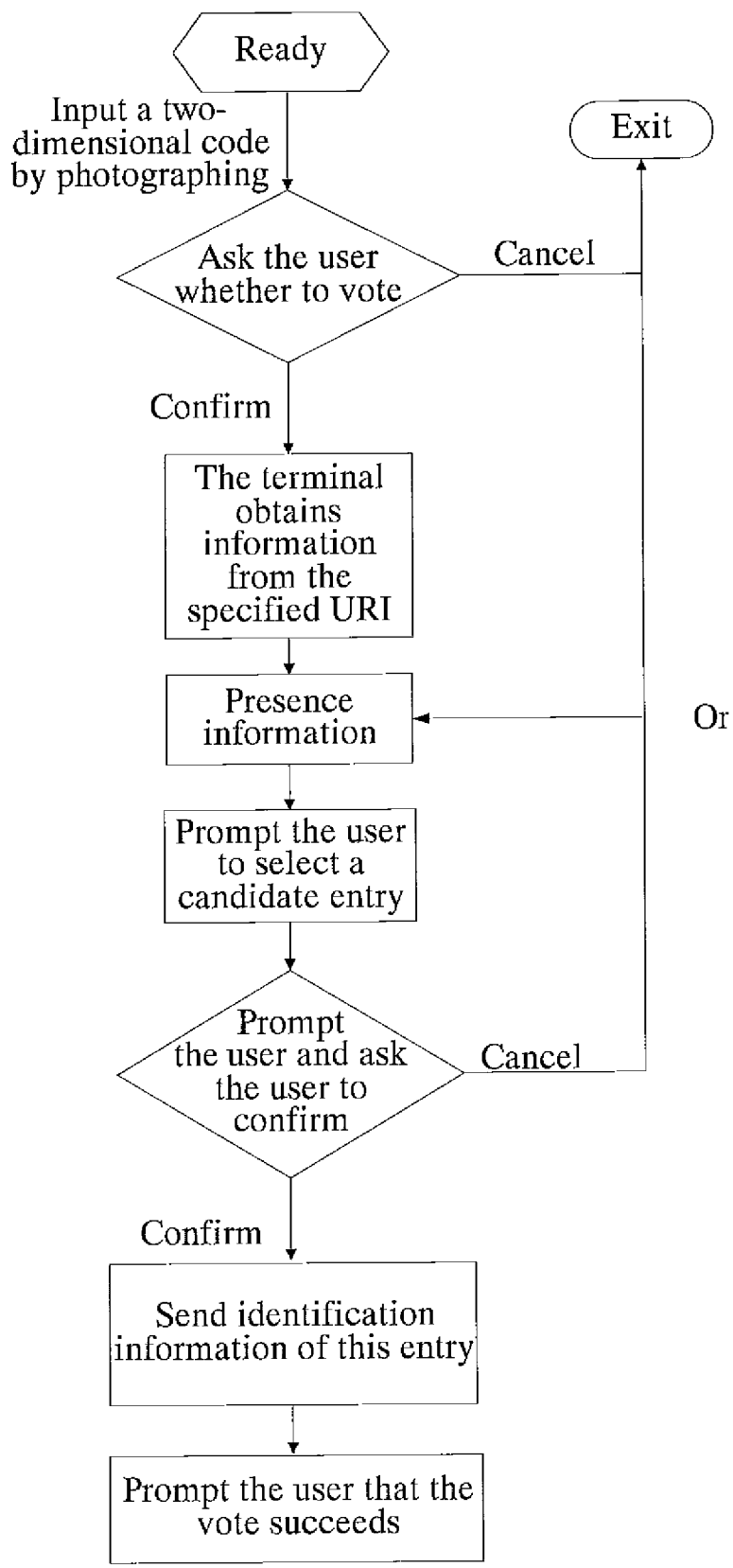
FIG. 2 shows a voting operation procedure provided in the first embodiment.

The two-dimensional code information input in the terminal includes an operation procedure of voting. FIG. 2 shows an exemplary operation procedure, which includes the following steps:

Step 1: "Vote for XX mass election is underway" is indicated to the user.

Step 2: The user selects "OK", and the terminal obtains the information (photo, background, and profile) about the candidates from the specified URI.

Step 3: The terminal presents a series of candidate entries (scrolled when necessary) to the user. Each entry is composed of pictures and brief texts. When the user selects an entry, more details of the entry may be displayed.

Step 4: The user selects an entry and presses the "OK" key.

Step 5: The terminal gives an indication "You have selected XX. Do you want to vote him?"

Step 6: The user select "OK", and the terminal sends the identifier of this candidate (such as "01") to the service platform.

Step 7: The terminal indicates to the user: "You have voted XX successfully".

Taking Extensible Markup Language (XML) format as an example, the vote operation procedure included in the two-dimensional code information is expressed in the following format:

```
<?xml version="1.0" encoding="UTF-8"?>
<!DOCTYPE votetemplate PUBLIC "-//hw//DTD VTD 1.0//ch"
"http://www.hw.com/VTD/1.0/DTD/vtd10.dtd">
<vote template xmlns="http://www.hw.com/2007/vtd">
  <header>
    <title>vote example</title>
    <description>VTD code sample for vote service</description>
    <date>2007-05-22</date>
    <version>1.0</version>
    <author>wang lei</author>
  </header>
  <body>
    <Wizard>
      <step guide = "Vote for XX mass election is underway" app= "participation confirmation"/>
      <step guide = get "http://www.hw.com/2007/vote-info"/>
      <step guide = app= "vote-info display"/>
      <step guide = "You have selected XX. Do you want to vote him?"
```

```
app= "vote selection confirmation"/>
        <step guide = app= "vote message sending"/>
            <step guide = "You have voted XX successfully"
app= "vote result processing"/>
        </Wizard>
</body>
</vote template>
```

The "app" above may be understood as the corresponding processing function module of the local vote application of the terminal. The app modules are described below:

"participation confirmation": judging whether the user confirms participation in the voting; allowing subsequent steps to go on only if the user selects "Yes"; quitting the procedure if the user selects "No";

"vote-info display": a local application of the terminal for presenting candidate entries of the vote;

"vote selection confirmation": recording the entry voted by the user, and prompting the user to confirm; allowing the subsequent steps to go on only if the user confirms by selecting "Yes";

"vote information sending": sending the vote information of the user in a specified format; and "vote result processing": indicating a success/failure result to the user.

Second Embodiment

This embodiment refers to using two-dimensional codes to perform Video On Demand (VOD) operations.

Figure 3:
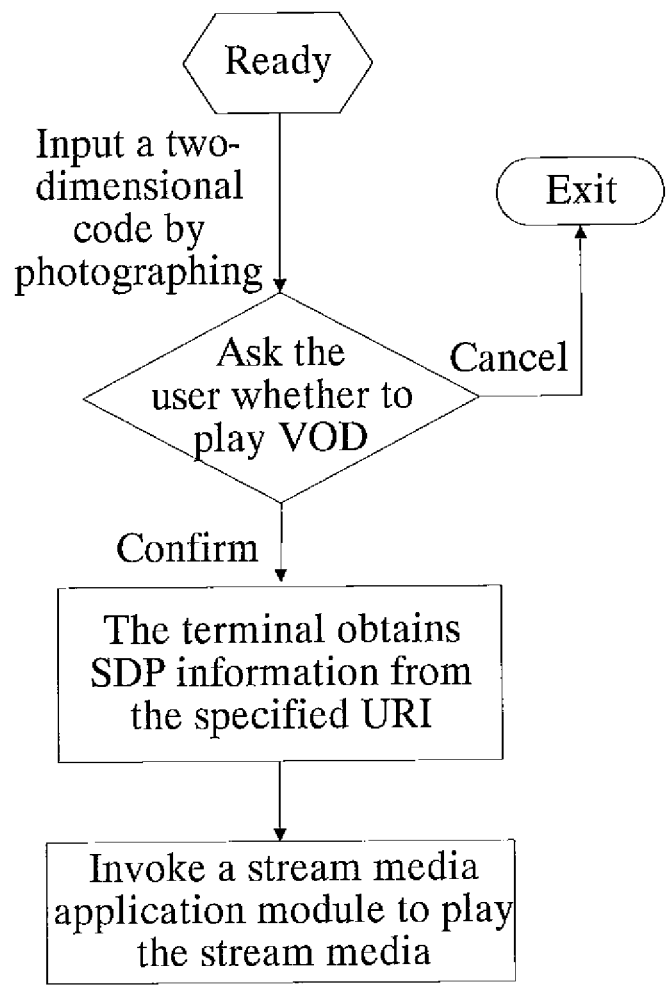
FIG. 3 shows a VOD operation procedure provided in the second embodiment.

Two-dimensional code information may be set for each scenic spot (for example, noted on the tour guide plate) in a scenic area. The two-dimensional code information may specify a VOD operation procedure. After the user uses a terminal to photograph the two-dimensional code information to input, the next VOD procedure begins automatically. FIG. 3 shows an exemplary VOD operation procedure, which includes the following steps:

Step 1: After the foregoing two-dimensional code is input into the user terminal, the user terminal enters a confirmation procedure automatically, and asks the user whether to play the introduction to this scenic spot. The subsequent steps go on only if the user confirms by selecting "Yes".

Step 2: The terminal obtains the media description SDP from a specified URI.

Step 3: The terminal invokes a stream media application module to complete the subsequent process of playing stream media. The terminal presents multimedia introduction to this scenic spot. In this way, the user enjoys multimedia tour guide services that accompany the user.

Taking the XML format as an example, the VOD operation procedure specified in the two-dimensional code information is expressed in the following format:

Given below is an exemplary format of the procedure information carried in the two-dimensional code:

```
<?xml version="1.0" encoding="UTF-8"?>
<!DOCTYPE vodtemplate PUBLIC "-//hw//DTD VTD 1.0//ch"
"http://www.hw.com/VTD/1.0/DTD/vtd10.dtd">
    <VOD template xmlns="http://www.hw.com/2007/vtd">
        <header>
            <title>VOD example</title>
            <description>VTD code sample for VOD service</description>
            <date>2007-05-22</date>
            <version>1.0</version>
            <author>wang lei</author>
        </header>
        <body>
            <Wizard>
                <step guide = "Do you want to play the introduction
to XX scenic spot?" app= "VOD confirmation"/>
                <step guide = get "http://www.hw.com/2007/vod/sdp"/>
                <step guide = app= "vod-info display"/>
            </Wizard>
        </body>
    </VOD template>
```

The "app" above may be understood as the corresponding processing function module of the local VOD application of the terminal. The app modules are described below:

"VOD conformation": judging whether the user confirms VOD; allowing subsequent steps to go on only if the user selects "Yes"; and "vod-info display": a local stream media application module of the terminal, which can use the media description file SDP to perform RTSP sessions, and obtain and play media streams.

Figure 4:
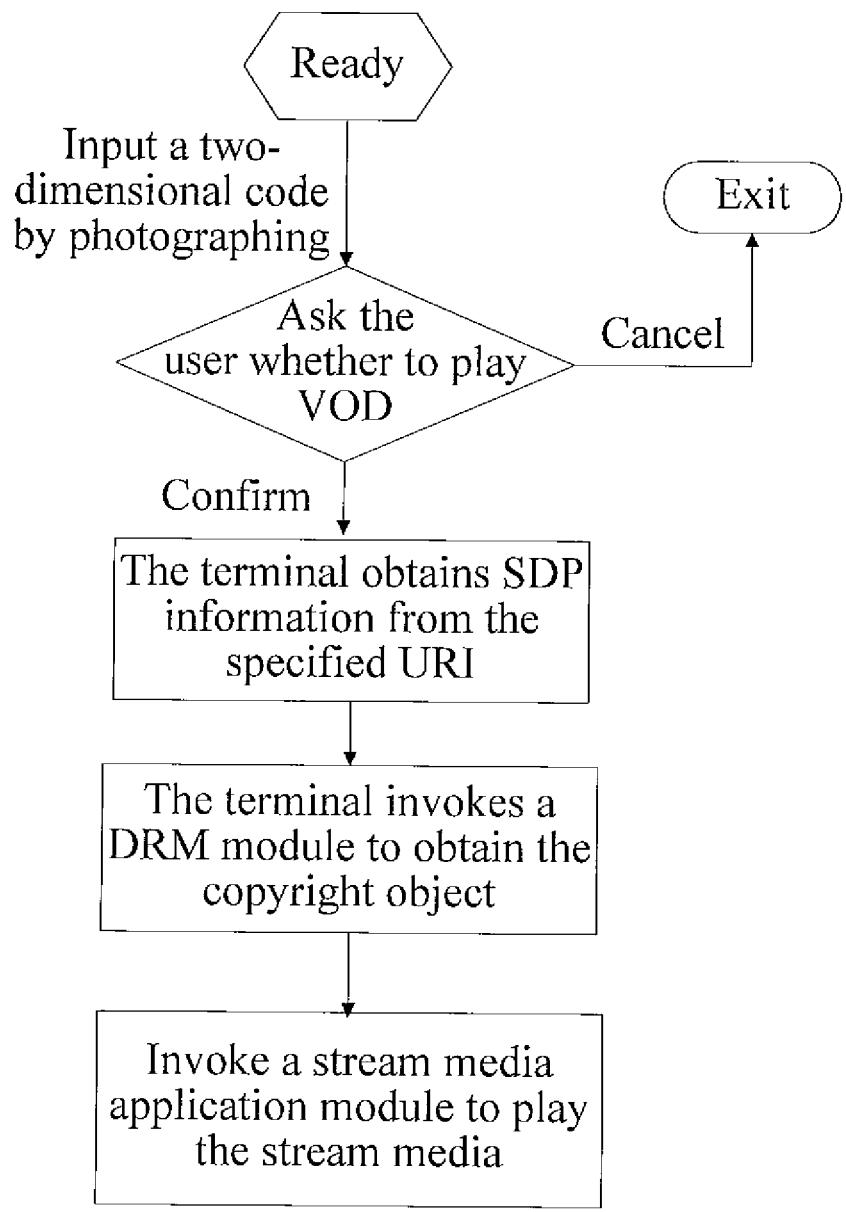
FIG. 4 shows a VOD operation procedure that involves a process of obtaining copyright objects in the second embodiment.

On certain occasions, copyright control (including purchase of copyright) is required for the VOD stream media that give the scenic spot introduction. In this case, the user terminal needs to obtain the copyright object before playing the stream media. FIG. 4 shows an exemplary VOD procedure that involves a process of obtaining the copyright object. The procedure includes the following steps:

Step 1: After the foregoing two-dimensional code is input into the user terminal, the user terminal enters a confirmation procedure automatically, and asks the user whether to play the introduction to this scenic spot. The subsequent steps go on only if the user confirms by selecting "Yes".

Step 2: The terminal obtains the media description SDP from the specified URI.

Step 3: The terminal invokes a Digital Right Management (DRM) module to obtain the copyright object.

Step 4: The terminal invokes a stream media module to complete the subsequent process of playing multimedia.

Taking the XML format as an example, the VOD operation procedure that involves a process of obtaining the copyright object in the two-dimensional code information is expressed in the following format:

```
<?xml version="1.0" encoding="UTF-8"?>
    <!DOCTYPE vodtemplate PUBLIC "-//hw//DTD VTD 1.0//ch"
"http://www.hw.com/VTD/1.0/DTD/vtd10.dtd">
    <VOD template xmlns="http://www.hw.com/2007/vtd">
        <header>
            <title>VOD example</title>
            <description>VTD code sample for VOD service</description>
            <date>2007-05-22</date>
            <version>1.0</version>
            <author>wang lei</author>
        </header>
        <body>
            <Wizard>
                <step guide = "Do you want to play the introduction
to XX scenic spot?" app= "VOD confirmation"/>
                <step guide = get "http://www.hw.com/2007/vod/sdp"/>
                <step guide = app= "vod-info RO-acq"/>
                <step guide = app= "vod-info display"/>
            </Wizard>
        </body>
    </VOD template>
```

The "app" above may be understood as the corresponding processing function module of the local VOD application of the terminal. The app module is: "Vod-info RO-acq": invoking a DRM module to obtain the copyright object.

After the second embodiment is applied, it is not necessary to deploy plenty of LCD screens in the scenic spots; through the terminal of the user, the user can perform VOD, walk and watch (listen) in the scenic spot, and enjoy the multimedia self-service tour guide. In this way, the cost to the scenic spot is reduced, and the human impact on the scenic spot is reduced.

Third Embodiment

This embodiment refers to using two-dimensional codes to purchase.

The RFID technology for purchase works only when the user pays after buying or consuming goods, and does not work for ticket booking (such as movie ticket and concert ticket) that requires prepayment. In this embodiment, the booking can be performed in advance through two-dimensional codes.

Introduction to movies and concerts is printed on materials such as newspaper and magazines, and the corresponding two-dimensional code is also printed. The two-dimensional code specifies the procedure of booking a ticket. After reading the two-dimensional code, the terminal performs the procedure of buying the ticket automatically.

Figure 5:
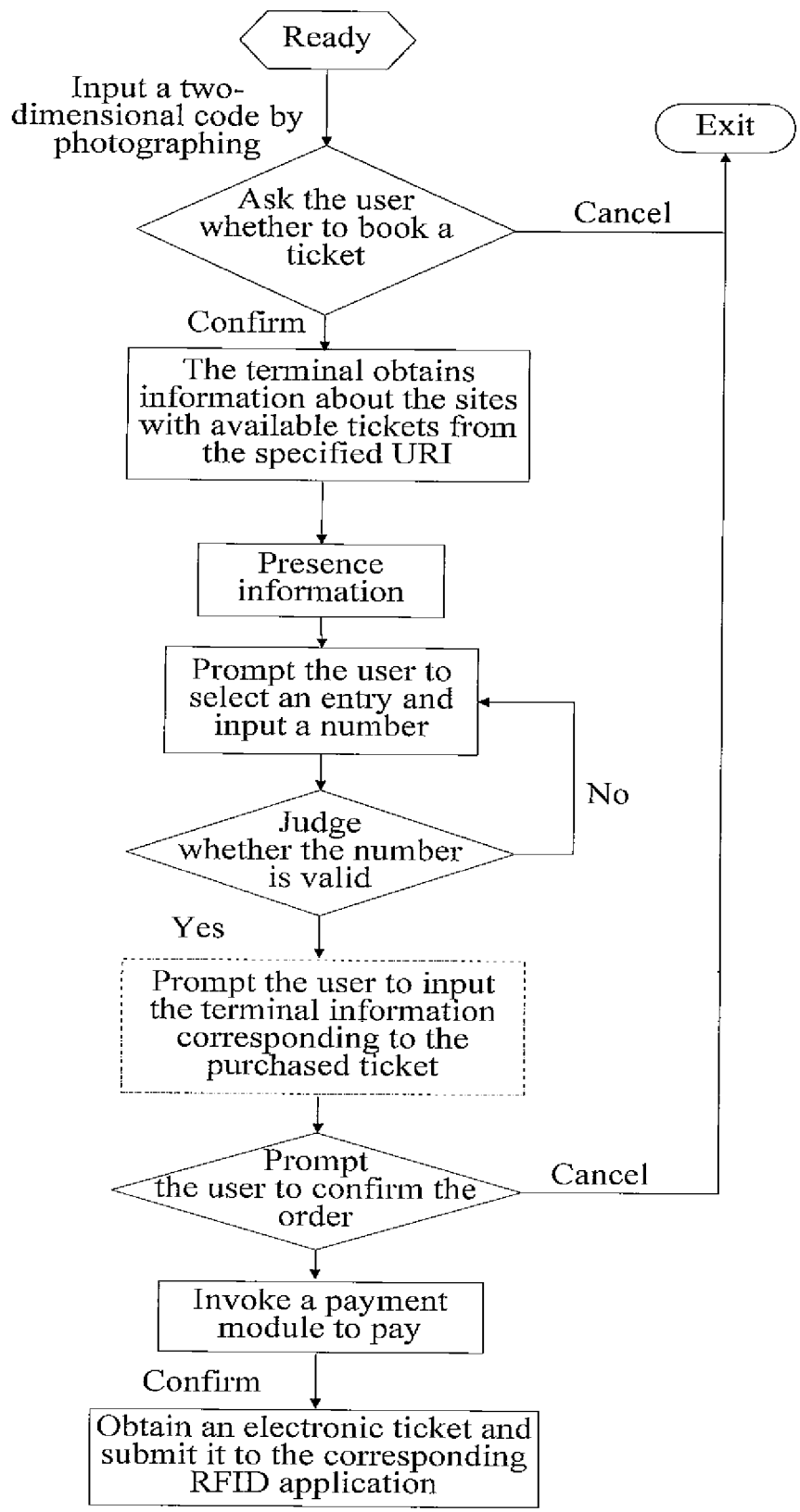
FIG. 5 shows an operation procedure of ordering tickets in the third embodiment.

FIG. 5 shows an exemplary procedure of booking a ticket. The procedure includes the following steps:

Step 1: After the two-dimensional code that specifies the procedure of booking a ticket is input into the user terminal, the user terminal enters a confirmation procedure automatically, and asks the user whether to purchase a ticket. The subsequent steps go on only if the user confirms by selecting "Yes".

Step 2: The terminal obtains a list of sites with available tickets.

Step 3: The terminal presents the optional site list (time, place, number of remaining tickets) to the user. The user selects an entry, and selects/inputs the number of tickets to be purchased. The terminal determines that the ticket number input by the user is valid, and goes to the next step.

Step 4: The terminal prompts the user to select/input the terminal numbers correlated with the ticket (the number of terminal numbers is equal to the number of tickets, and the phone number of this terminal may be a default item). This step is optional.

Step 5: The terminal prompts the user to confirm the order.

Step 6: The terminal invokes an electronic payment module to pay.

Step 7: The terminal receives the electronic ticket, and sends it to the RFID application of the terminal. The RFID application of the terminal stores the electronic ticket, and indicates to the user that the electronic ticket is purchased successfully. Afterward, the user can hold the terminal to watch the movie or concert through RFID authentication.

Taking the XML format as an example, the ticket booking operation procedure specified in the two-dimensional code information is expressed in the following format:

```
<?xml version="1.0" encoding="UTF-8"?>
<!DOCTYPE purchase-template
PUBLIC "-//hw//DTD VTD 1.0//ch"
"http://www.hw.com/VTD/1.0/DTD/vtd10.dtd">
<purchase template xmlns="http://www.hw.com/2007/vtd">
<header>
```

-continued

```
    <title>purchase example</title>
    <description>VTD code sample for purchase service</description>
    <date>2007-05-22</date>
    <version>1.0</version>
    <author>wang lei</author>
</header>
<body>
    <Wizard>
        <step guide = "Do you want to purchase the ticket of Cat now" app= "confirmation"/>
        <step guide = get "http://www.hw.com/2007/ticket/timeTable"/>
        <step guide = app= "order generating"/>
        <step guide= "You are purchasing X tickets of Cat scheduled on XX. Please specify the terminal number to which the electronic ticket is directed (each terminal is correlated with one ticket)". app="ticket assignment"/>
        <step guide= "You are purchasing X tickets of Cat scheduled on XX for the following terminals. Please confirm". app="order confirmation"/>
        <step guide = app= "order submitting"/>
        <step guide = app= "paying"/>
        <step guide = app= "electronic ticket collecting"/>
    </Wizard>
</body>
</purchase template>
```

The "app" above may be understood as the corresponding processing function module of the local purchase application of the terminal. The app modules are described below:

"confirmation": judging whether the user confirms; allowing subsequent steps to go on only if the user selects "Yes"; quitting the procedure if the user selects "No";

"order generating": the terminal presents the optional site list (time, place, number of remaining tickets) to the user. The user selects an entry, and selects/inputs the number of tickets to be purchased. The terminal determines that the ticket number input by the user is valid, and goes to the next step;

"ticket assignment": the terminal prompts the user to select/input the terminal numbers correlated with the ticket, and determines that the number of terminal numbers is equal to the number of tickets. The phone number of this terminal may be a default item;

"order confirmation": displaying the order result to the user, and requiring the user to confirm; allowing the subsequent steps to go on only if the user selects "Yes";

"order submitting": invoking a transmission mode such as HTTP POST and SMS to submit the order to the service platform;

"paying": a mobile electronic payment module, which may be based on the conventional art; and "electronic ticket collecting": the terminal collects the electronic ticket which is available to the RFID application, and provides a necessary indication to the user.

Fourth Embodiment

This embodiment refers to using two-dimensional codes to donate.

Two-dimensional codes are printed on donation documents (for example, for education support or rescue in a flood disaster). Table 1 gives examples of the two-dimensional codes.

TABLE 1

| 5 yuan | 10 yuan | 20 yuan | 50 yuan | 100 yuan | other |
|---|---|---|---|---|---|
| Two-dimensional code 1 | Two-dimensional code 2 | Two-dimensional code 3 | Two-dimensional code 4 | Two-dimensional code 5 | Two-dimensional code 6 |

Figure 6:
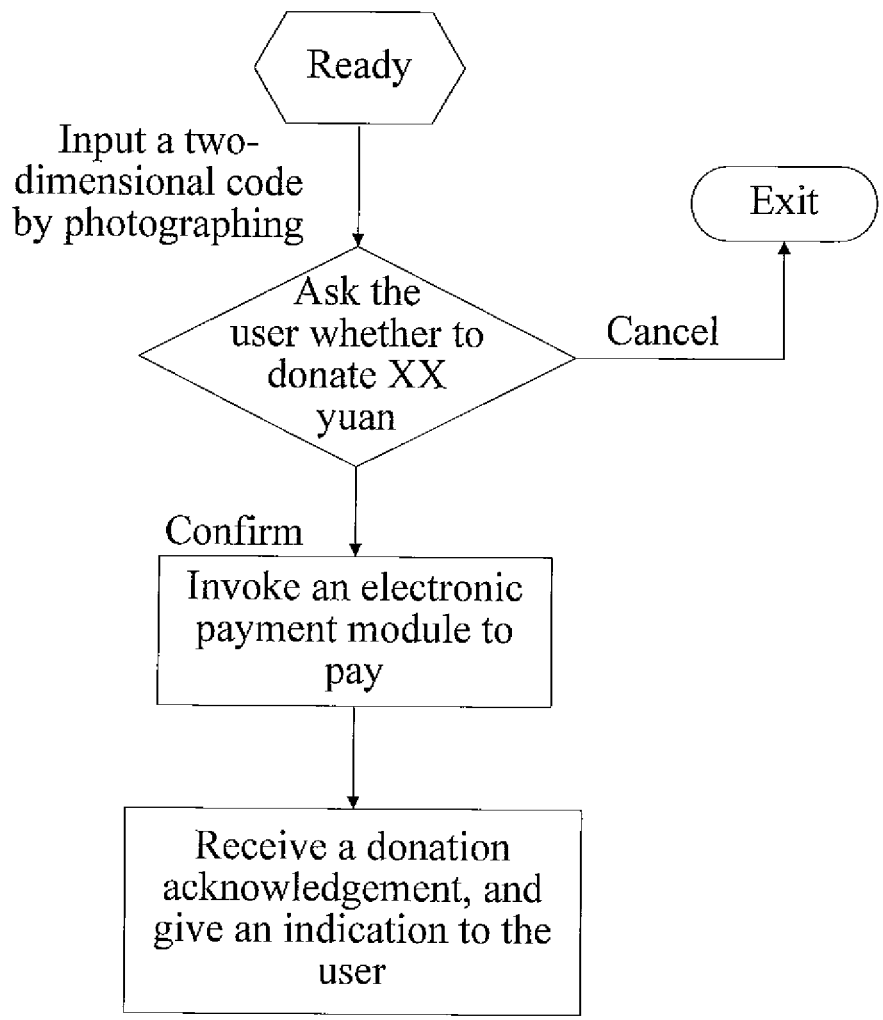
FIG. 6 shows an operation procedure of donating a fixed sum in the fourth embodiment.

The terminal reads the two-dimensional code in Table 1, and the donation procedure begins. A fixed sum is donated, or the user inputs a sum in the donation process. FIG. 6 shows a donation procedure that donates a fixed sum. The procedure includes the following steps:

Step 1: After the foregoing two-dimensional code is input into the user terminal, the user terminal enters a confirmation procedure automatically, and asks the user to confirm. The subsequent steps go on only if the user confirms by selecting "Yes".

Step 2: The terminal invokes an electronic payment module to pay.

Step 3: The terminal receives a donation acknowledgement, and indicates to the user.

Taking the XML format as an example, a donation operation procedure that involves a fixed sum of donation in the two-dimensional code information is expressed in the following format:

```
<?xml version="1.0" encoding="UTF-8"?>
<!DOCTYPE contribute-template
PUBLIC "-//hw//DTD VTD 1.0//ch"
"http://www.hw.com/VTD/1.0/DTD/vtd10.dtd">
<donation template xmlns="http://www.hw.com/2007/vtd">
    <header>
        <title>donation example</title>
        <description>VTD code sample for donation service</description>
        <date>2007-05-22</date>
        <version>1.0</version>
        <author>wang lei</author>
    </header>
    <body>
        <Wizard>
            <step guide = "Do you want to donate 50 yuan to the hope education project now" app= "confirmation"/>
            <step guide = app= "paying"/>
            <step guide = "You have donated 50 yuan to the hope education project successfully. Thank you for your kindness" app= "donation acknowledgement"/>
        </Wizard>
    </body>
</donation template>
```

The "app" above may be understood as the corresponding processing function module of local donation application of the terminal. The app modules are described below:

"confirmation": judging whether the user confirms; allowing subsequent steps to go on only if the user selects "Yes"; quitting the procedure if the user selects "No";

"paying": a mobile electronic payment module, which may be based on the conventional art; and "donation acknowledgement": obtaining a donation acknowledgement, and giving a necessary indication to the user.

Figure 7:
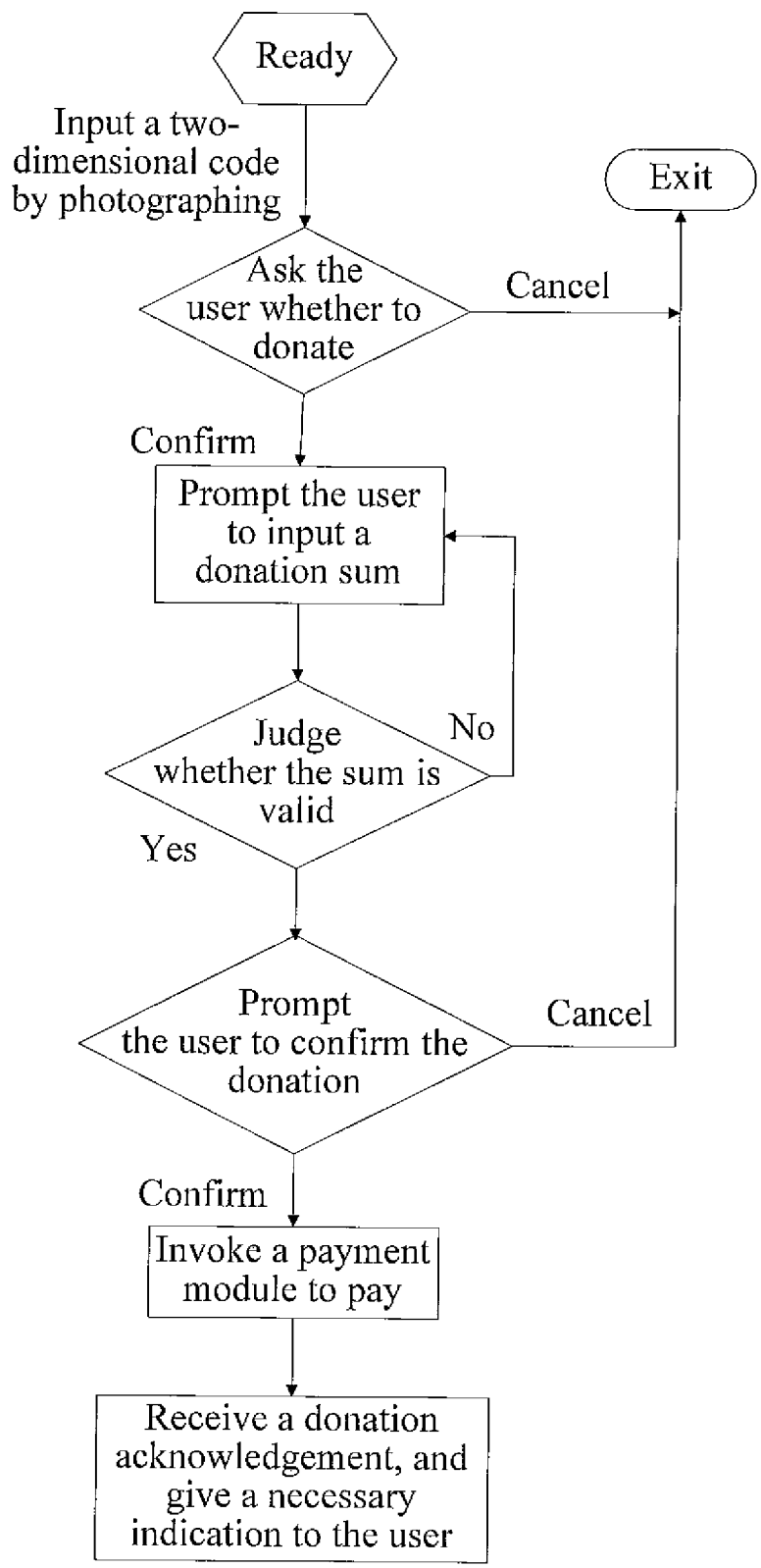
FIG. 7 shows an operation procedure that involves an input donation sum in the fourth embodiment.

FIG. 7 shows a donation procedure that involves input of a sum. The procedure includes the following steps:

Step 1: After the two-dimensional code is input into the user terminal, the user terminal enters a confirmation procedure automatically, and asks the user to confirm. The subsequent steps go on only if the user confirms by selecting "Yes".

Step 2: The terminal prompts the user to input a donation sum.

Step 3: The terminal prompts the user to confirm the donation sum.

Step 4: The terminal invokes an electronic payment module to pay.

Step 5: The terminal receives a donation acknowledgement, and gives a necessary indication to the user.

Taking the XML format as an example, a donation operation procedure that prompts the user to input a donation sum in the two-dimensional code information is expressed in the following format:

```
<?xml version="1.0" encoding="UTF-8"?>
<!DOCTYPE contribute-template
PUBLIC "-//hw//DTD VTD 1.0//ch"
"http://www.hw.com/VTD/1.0/DTD/vtd10.dtd">
<donation template xmlns="http://www.hw.com/2007/vtd">
    <header>
        <title>donation example</title>
        <description>VTD code sample for donation service</description>
        <date>2007-05-22</date>
        <version>1.0</version>
        <author>wang lei</author>
    </header>
    <body>
        <Wizard>
            <step guide = "Do you want to donate to the hope education project now" app= "confirmation"/>
            <step guide = "How much do you donate" app= "sum inputting"/>
            <step guide = "You are donating XX yuan to the hope education project. Please confirm" app= "sum inputting"/>
            <step guide = app= "paying"/>
            <step guide = app= "donation acknowledgement"/>
        </Wizard>
    </body>
</donation template>
```

The "app" above may be understood as the corresponding processing function module of local donation application of the terminal. The app modules are described below:

"confirmation": judging whether the user confirms; allowing subsequent steps to go on only if the user selects "Yes"; quitting the procedure if the user selects "No";

"sum inputting": prompting the user to input a donation sum and confirm the sum;

"paying": a mobile electronic payment module, which may be based on the conventional art; and "donation acknowledgement": obtaining a donation acknowledgement, and giving a necessary indication to the user.

Fifth Embodiment

This embodiment refers to using two-dimensional codes to obtain information.

In a scenic area, a user (tourist) purchases a ticket, on which a two-dimensional code is printed. The two-dimensional code specifies a procedure of obtaining a profile of the scenic area (including a map of the scenic area). The user may input the two-dimensional code information into a terminal by photographing the two-dimensional code with the terminal. The terminal executes a procedure of obtaining information, whereupon the user can see the profile of the scenic area on the terminal.

Figure 8:
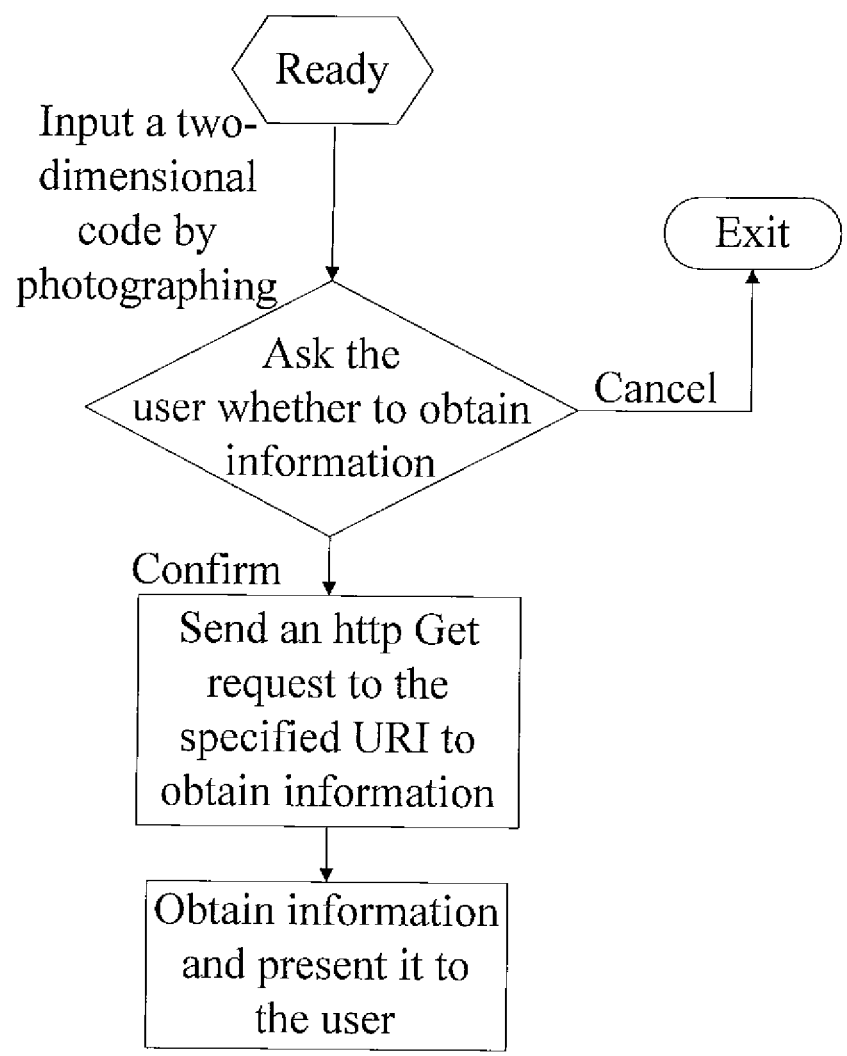
FIG. 8 shows an operation procedure of obtaining information in the fifth embodiment.

FIG. 8 shows an exemplary procedure of obtaining information. The procedure includes the following steps:

Step 1: After the two-dimensional code is input into the user terminal, the user terminal enters a confirmation procedure automatically, and asks the user whether to obtain the profile of the scenic spot. The subsequent steps go on only if the user confirms by selecting "Yes".

Step 2: The terminal sends an HTTP GET message (that carries capability information of the terminal) to the specified URI to obtain the profile of the scenic area (the delivered information varies with the capabilities of the terminal).

Step 3: After obtaining the profile information, the terminal presents the profile of the scenic spot to the user.

Taking the XML format as an example, the information obtaining operation procedure specified in the two-dimensional code information is expressed in the following format:

```
<?xml version="1.0" encoding="UTF-8"?>
<!DOCTYPE get-info-template
PUBLIC "-//hw//DTD VTD 1.0//ch"
"http://www.hw.com/VTD/1.0/DTD/vtd10.dtd">
<information obtaining template
xmlns="http://www.hw.com/2007/vtd">
    <header>
        <title>example of obtaining information</title>
        <description>VTD code sample for information obtaining service</description>
        <date>2007-05-22</date>
        <version>1.0</version>
        <author>wang lei</author>
    </header>
    <body>
        <Wizard>
            <step guide = "Do you want to obtain a profile of XX scenic spot?" app= "confirmation"/>
            <step guide = get "http://www.hw.com/2007/getinfo"/>
            <step guide = app= "get-info display"/>
        </Wizard>
</body>
</template of obtaining information>
```

The "app" above may be understood as the corresponding processing function module of local data obtaining application of the terminal. The app modules are described below:

"confirmation": judging whether the user confirms; allowing subsequent steps to go on only if the user selects "Yes"; quitting the procedure if the user selects "No"; and "get-info display": presenting the obtained data.

Sixth Embodiment

Figure 9:
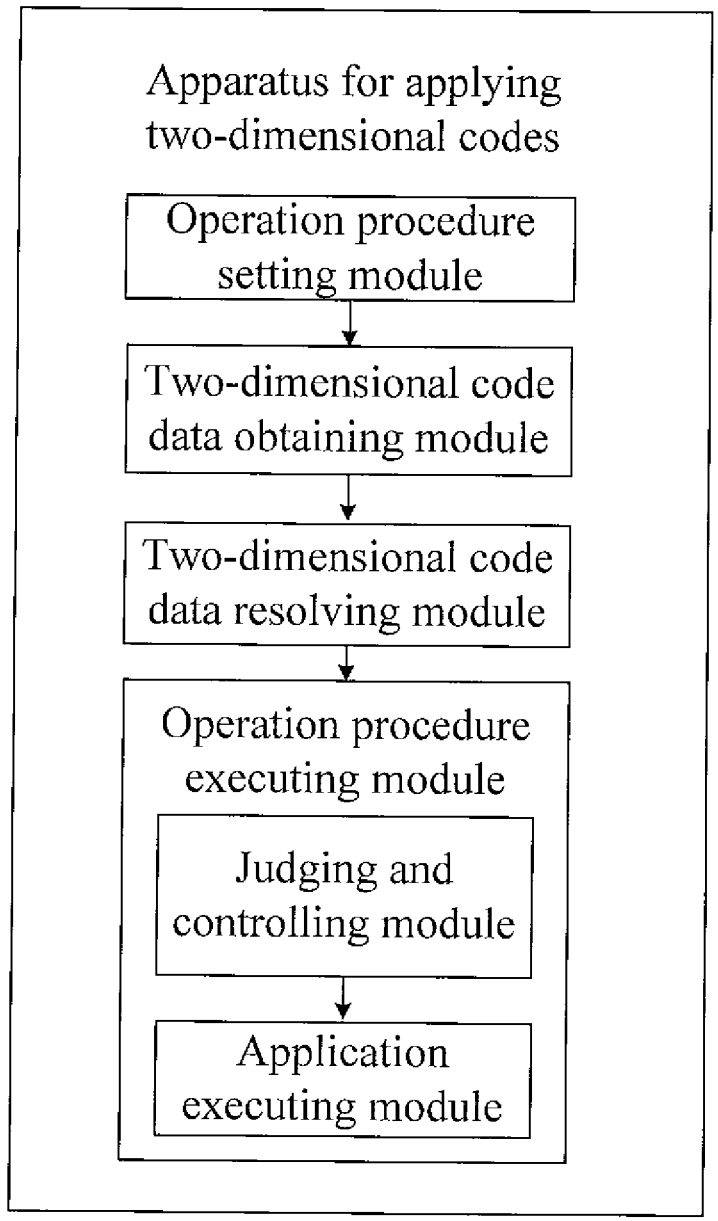
FIG. 9 shows a structure of an apparatus for applying two-dimensional codes in the sixth embodiment.

An apparatus for applying two-dimensional codes is provided in this embodiment. FIG. 9 shows a structure of the apparatus. The apparatus includes the following modules:

an operation procedure setting module, adapted to set specific format information in the two-dimensional code data, where the specific format information specifies the operation procedure;

a two-dimensional code data obtaining module, adapted to obtain and store two-dimensional code data;

a two-dimensional code data resolving module, adapted to resolve the two-dimensional code data obtained by the two-dimensional code data obtaining module to obtain an operation procedure specified in the two-dimensional code data; and an operation procedure executing module, adapted to invoke a corresponding application module to execute the operation procedure obtained by the two-dimensional code data resolving module.

The operation procedure executing module includes:

a judging and controlling module, adapted to make a judgment according to the operation procedure information, and invoke the corresponding application modules according to the judgment result; and an application executing module, adapted to use the application module invoked by the judging and controlling module to execute the operation steps in the operation procedure and perform the service corresponding to the operation procedure.

The foregoing application apparatus may be a wireless terminal or wired terminal.

It is worthy of attention that the units included in the foregoing apparatus embodiment are sorted according to functional logics, but are not limited to such sorting. Any sorting of the units is appropriate only if the corresponding functions of the units are implemented successfully. The names of the functional units are given herein for the purpose of identification only, and are not designed to restrict the protection scope of the present invention.

Persons of ordinary skilled in the art may understand that all or a part of the steps of the method provided in the embodiments of the present invention may be implemented by a program instructing relevant hardware, for example, by a computer-executable program. The program may be stored in a readable storage medium such as RAM, magnetic disk, or CD-ROM.

In conclusion, in the embodiments of the present invention, a series of operation procedure information is specified in the two-dimensional codes. One the one hand, a friendly service operation guide is provided for the user; on the other hand, the users are guided to perform the steps in the service procedure, the information fed back by the users is standardized, the user terminal is more extensible, and the processing of the service platform is simplified.

The above descriptions are merely preferred embodiments of the present invention, but not intended to limit the scope of the present invention. Any modifications, variations or replacement that can be easily derived by those skilled in the art should fall within the scope of the present invention. Therefore, the protection scope of the present invention is subject to the appended claims.

What is claimed is:

1. A method for applying two-dimensional codes, the method comprising:

reading, by a terminal, two-dimensional code data;

resolving, by the terminal, the two-dimensional code data to obtain an operation procedure specified in the two-dimensional code data, wherein the operation procedure is specified through information of a specific format and is for booking a ticket;

inquiring, by the terminal, whether a user of the terminal wants to purchase a ticket;

obtaining, by the terminal, a list of sites with available tickets if the user wants to purchase a ticket;

presenting to the user, by the terminal, an optional site list including time, place and number of remaining tickets;

receiving, by the terminal, an entry selected by the user and a number of tickets to be purchased;

determining, by the terminal, the number of tickets to be purchased is valid;

prompting the user, by the terminal, to provide a confirmation;

invoking, by the terminal, an electronic payment module enabling the user to pay;
receiving, by the terminal, an electronic ticket;
storing, by the terminal, the received electronic ticket by a radio frequency identification (RFID) application of the terminal; and
indicating, by the terminal, to the user that the electronic ticket is purchased successfully;
wherein after determining, by the terminal, the number of tickets to be purchased is valid, the method further comprises:
prompting the user, by the terminal, to select or input terminal numbers correlated with the ticket, wherein the number of the terminal numbers is equal to the number of the tickets and the phone number of the terminal is a default item.

2. An apparatus for applying two-dimensional codes, the apparatus comprising:
a two-dimensional code data obtaining module, adapted to obtain and store two-dimensional code data;
a two-dimensional code data resolving module, adapted to resolve the two-dimensional code data obtained by the two-dimensional code data obtaining module to obtain an operation procedure specified in the two-dimensional code data; and
an operation procedure executing module, adapted to invoke a corresponding local application of the apparatus to execute the operation procedure obtained by the two-dimensional code data resolving module: wherein the operation procedure is for booking a ticket and the operation procedure executing module is adapted to:
inquire whether a user of the terminal wants to purchase a ticket;
obtain a list of sites with available tickets if the user wants to purchase a ticket;
present to the user an optional site list including time, place and number of remaining tickets;
receive an entry selected by the user and a number of tickets to be purchased;
determine the number of tickets to be purchased is valid;
prompt the user to provide a confirmation;
invoke an electronic payment module enabling the user to pay;
receive an electronic ticket;
sending the received electronic ticket to a radio frequency identification (RFID) application of the terminal for storing; and
indicate to the user that the electronic ticket is purchased successfully;
wherein the operation procedure executing module is further adapted to: prompt the user to select or input terminal numbers correlated with the ticket after determining that the number of tickets to be purchased is valid; the number of the terminal numbers is equal to the number of the tickets and the phone number of the terminal is a default item.

* * * * *